US009846487B2

(12) United States Patent
Divakara et al.

(10) Patent No.: US 9,846,487 B2
(45) Date of Patent: Dec. 19, 2017

(54) METHOD OF USING PIR ARRAYS FOR GESTURE RECOGNITION IN SECURITY SYSTEMS

(71) Applicant: Honeywell International Inc., Morristown, NJ (US)

(72) Inventors: Manjunatha Divakara, Tumkur (IN); Balamurugan Ganesan, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 331 days.

(21) Appl. No.: 14/624,703

(22) Filed: Feb. 18, 2015

(65) Prior Publication Data
US 2016/0239094 A1 Aug. 18, 2016

(51) Int. Cl.
| | |
|---|---|
| H04B 10/00 | (2013.01) |
| G06F 3/01 | (2006.01) |
| G08C 23/04 | (2006.01) |
| G06F 3/03 | (2006.01) |
| G08B 25/00 | (2006.01) |
| H04J 14/00 | (2006.01) |
| G08B 25/01 | (2006.01) |

(52) U.S. Cl.
CPC ............ *G06F 3/017* (2013.01); *G06F 3/0304* (2013.01); *G08B 25/008* (2013.01); *G08C 23/04* (2013.01); *G08B 25/016* (2013.01)

(58) Field of Classification Search
CPC .... H04B 10/114; H04B 10/1141; G06F 3/017
See application file for complete search history.

(56) References Cited

U.S. PATENT DOCUMENTS

| | | | |
|---|---|---|---|
| 2003/0132974 A1* | 7/2003 | Bodin | G06F 3/017 715/863 |
| 2012/0127306 A1 | 5/2012 | Oh et al. | |
| 2012/0200486 A1* | 8/2012 | Meinel | H04N 5/33 345/156 |
| 2015/0022316 A1 | 1/2015 | Dixon et al. | |
| 2015/0022347 A1 | 1/2015 | Aswath et al. | |
| 2015/0043887 A1 | 2/2015 | Gurudoss et al. | |

FOREIGN PATENT DOCUMENTS

EP  2 741 265 A1  6/2014

OTHER PUBLICATIONS

Extended European search report for corresponding EP patent application 16155100.7, dated Jun. 23, 2016.
Wojtczuk, et al; PIR Sensor Array for Hand Motion Recognition; Sensordevices 2011: The Second International Conference on Sensor Device Technologies and Applications; pp. 99-102.

* cited by examiner

*Primary Examiner* — Daniel Dobson
(74) *Attorney, Agent, or Firm* — Husch Blackwell LLP

(57) ABSTRACT

A apparatus is provided that includes a security system that protects a secured geographic area, a passive infrared (PIR) array associated with the security system, and a processor of the security system that detects one of a plurality of predetermined hand motions by an authorized user based upon a signal from the PIR array and causes the security system to execute a predetermined instruction associated with that one predetermined hand motion.

16 Claims, 3 Drawing Sheets

METHOD OF USING PIR ARRAYS FOR GESTURE RECOGNITION IN SECURITY SYSTEMS

FIELD

This application relates to security systems and, more particularly, to surveillance systems.

BACKGROUND

Systems are known to protect people and assets within secured areas. Such systems are typically based upon the use of one or more sensors that detect threats within a secured area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While security systems work well, they are sometimes difficult to set up and use, especially where a user must enter a personal identification number to control the security systems. Accordingly, a need exists for better methods of expediting the use of such systems.

DETAILED DESCRIPTION

Figure 1:
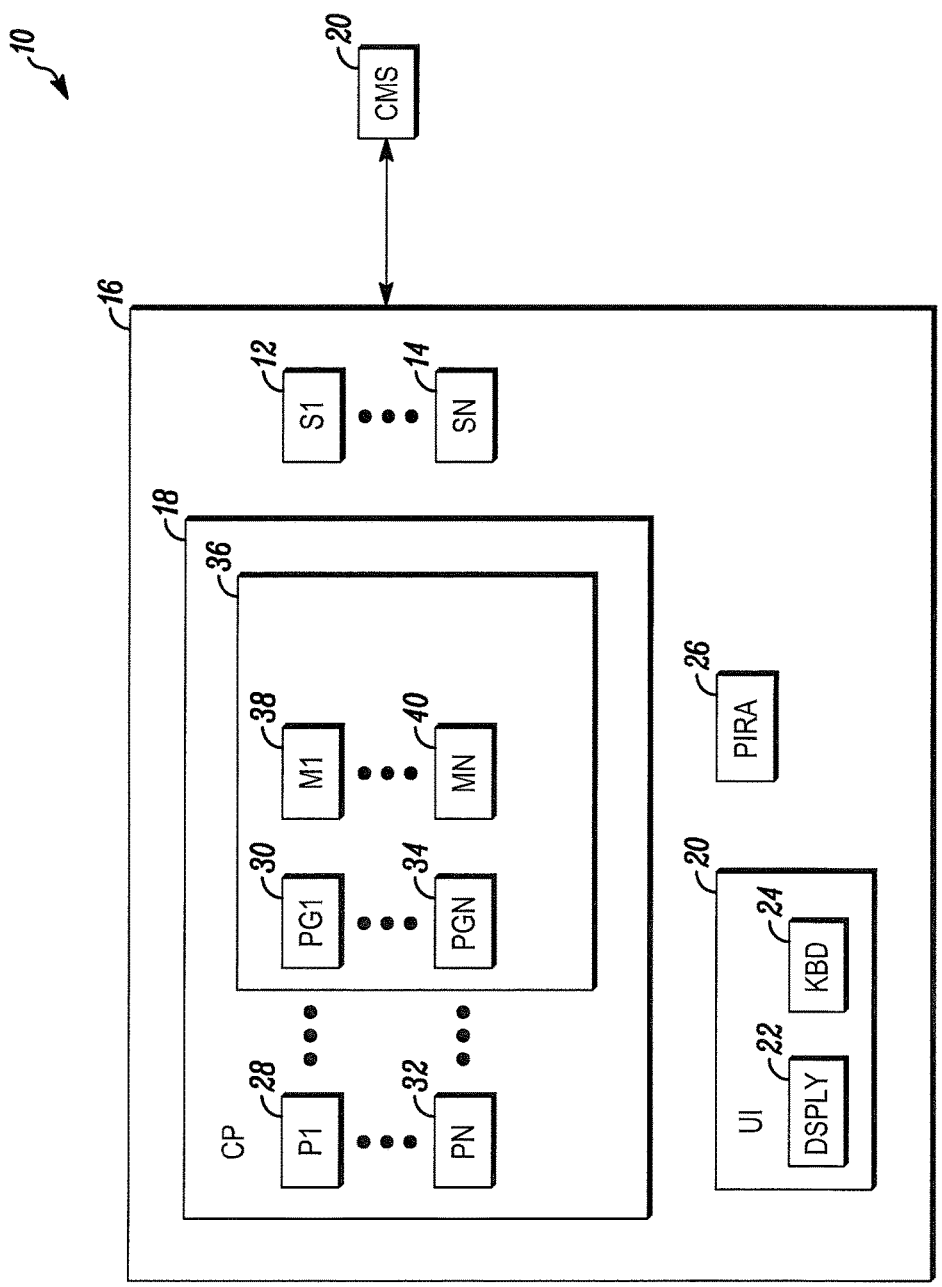
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the security system are a number of sensors 12, 14 used to detect threats within a secured geographic area 16.

The sensors may be embodied in any of a number of different formats. For example, at least some of the sensors may be limit switches placed on the doors and/or windows surrounding the secured area and that operate to detect intruders. Other of the sensors may be passive infrared (PIR) sensors or cameras placed within the interior of the area and that detect intruders who have been able to circumvent the sensors along the periphery.

Still other of the sensors may be smoke and/or fire detectors. The sensors may also wired or wireless.

The sensors may be monitored by a control panel 18 located within the secured area (as shown in FIG. 1) or located remotely. Upon activation of one of the sensors, the control panel may compose and send an alarm message to a central monitoring station 20. The central monitoring station may respond by summoning the appropriate help (e.g., fire department, police, medical, etc.).

The security system may be controlled via a user interface 20. The user interface may include a display 22 and a keyboard 24. An authorized user may control the system by entry of a personal identification number (PIN) and instruction through the keyboard. The control panel may respond to the instruction by showing the status of the system and any activated sensors on the display.

Associated with the user interface may be a passive infrared (PIR) array 26. The PIR array may be structured as a two-dimensional array (e.g., a 4×4 array) of PIR sensors.

The PIR array is arranged in parallel with the keyboard as a source of instructions for control of the security system. Instructions, in this regard, are initiated and recognized by predefined movements of the authorized user. The movements are detected by the PIR array and converted into one or more predefined instructions that are recognized by the PIR array and executed within the security system.

Included within the control panel, the user interface, and the PIR array may be one or more processor apparatus (processors) 28, 32 each operating under control of one or more computer programs 30, 34 loaded from a non-transitory computer readable medium (memory) 36. As used herein, reference to a step of a computer program is also reference to the processor that executed that step.

During use, a status processor may monitor the keyboard and PIR array for instructions directed to control of the security system. For example, an authorized user may enter a PIN and a disarm command. The status processor may detect the PIN and disarm command and cause the system to enter a disarmed state.

Alternatively, the user may enter a command through the keyboard or make a predefined motion that may be detected via the PIR array. For example, at least some commands (e.g., arm, ambush, etc.) do not require entry of a PIN and are of a relatively simple format that may be detected via a hand motion by the authorized user.

In this regard, each predefined motion may be defined by a set of parameters saved within a respective movement detection or gesture file 38, 40 in memory. The motion may be defined by a relative direction of movement (e.g., horizontal, vertical, diagonal, etc.) and by a speed of movement. Each file has a corresponding command or instruction associated with the file.

Under the illustrated embodiment, the PIR array may be located adjacent or within the keyboard of the user interface or located on a nearby wall. In this way, the user is able to make a predefined movement as he/she watches the display in order to confirm acceptance and execution of the intended instruction requested by the hand movement.

For example, one predefined movement may involve the user placing his/her hand in front of the PIR array and sweeping the hand horizontally to the right. This may be used to define an arm away command. Similarly, the user sweeping his/her hand to the left may be used to define an arm stay command or instruction.

As a more specific example, assume that the security system is in a disarmed state and the user may wish to execute an arm away command. In this case, the user may simply approach the user interface, extend his/her hand towards the PIR array, and sweep his/her hand horizontally to the left. The PIR array (and processor) may detect and match this movement with the content of the corresponding gesture file, retrieve the arm away command, and transfer it to the status processor. The status processor may execute this command and display the arm away status on the display of the user interface.

In this regard, a PIR array processor may monitor an output of PIR sensors of the array in order to detect a direction and speed of hand movements. As each movement is detected, the processor may compare a direction and speed with the parameters within each gesture file. When a match is detected, the command associated with the matched movement file is retrieved and executed by the security system.

The gesture files may be created or amended using a number of different methods. Under one embodiment, an update processor may display a gesture update icon on the user interface. In order to update or add to the gesture files, a user may activate the icon and be presented with a set of menus for identifying a gesture and a command to be associated with the gesture as shown in FIGS. 2 and 3.

Figure 2:
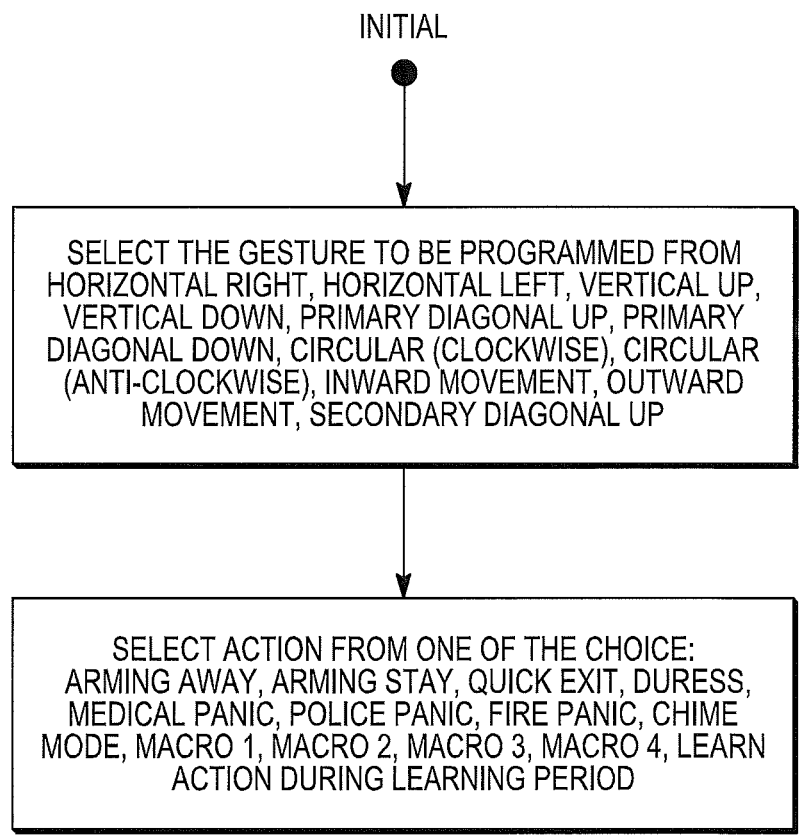
FIG. 2 illustrates a flow chart of steps used in the system of FIG. 1 for associating a gesture with a command.

For example, the user may first select the general type of gesture to be used as shown in the first step of FIG. 2. The user may then select the command or instruction to be associated with the gesture. The user may activate an accept button to complete the process.

Figure 3:
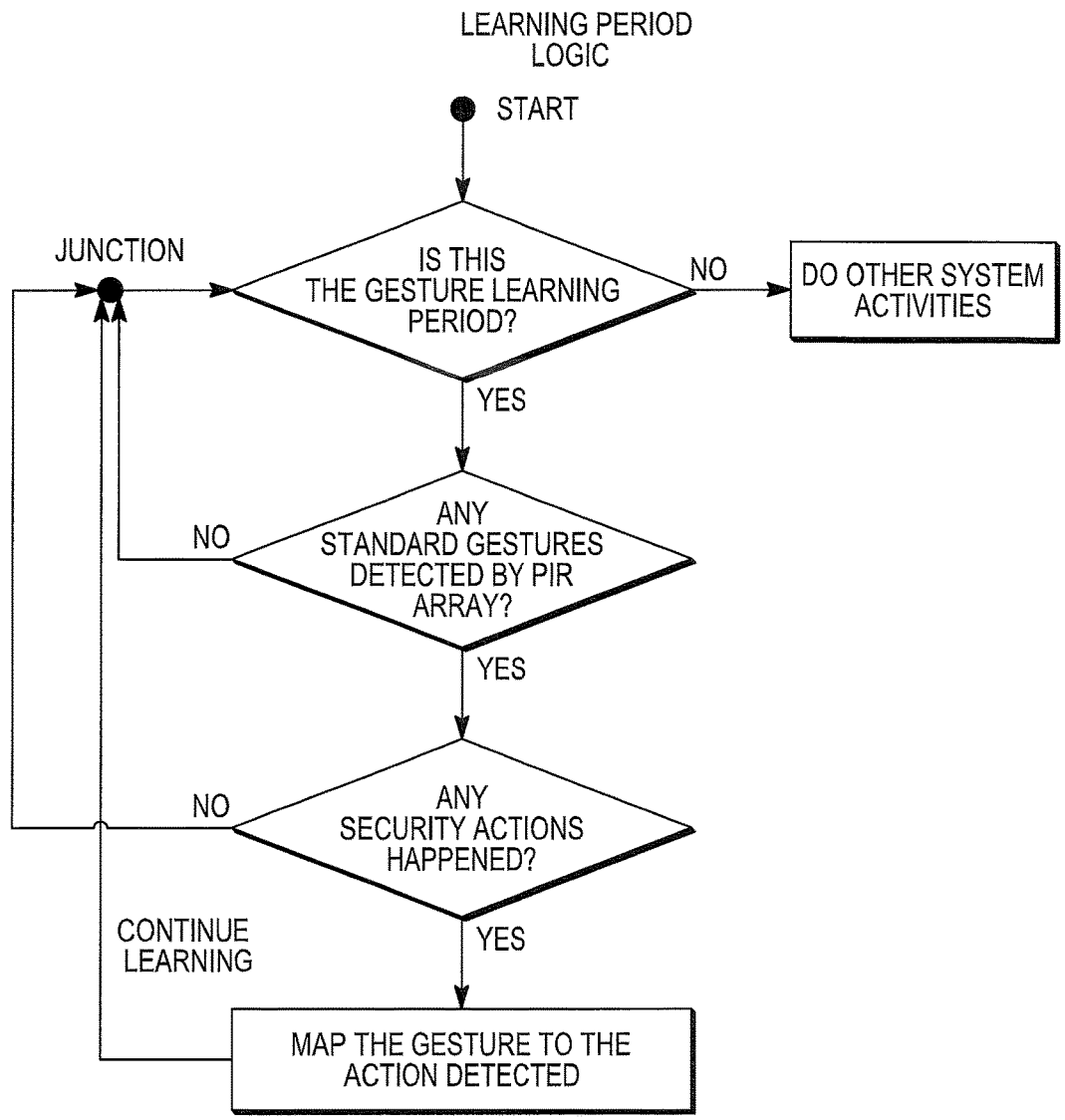
FIG. 3 depicts additional steps of FIG. 2 in saving gesture commands to the files of the system of FIG. 1.

Alternatively, the user may select a training button to further refine the selected gesture as shown in FIG. 3. In the training mode, the user may perform an intended gesture one or more times. In response, a gesture training processor uses the selected type of gesture in combination with the gesture detected through the PIR array to save a more precise set of parameters of the intended gesture. If the selected gesture can be correlated to the detected gesture, then the training processor may map the selected command to the detected gesture and save the associated parameters in the files.

The embodiments disclosed herein differ from other prior systems using gesture based recognition in a number of ways. For example, some of them are wearable units or use costly solutions involving video analytics. These existing methodologies are not suited for low cost, ease of use, and/or lower power requirements.

In security products currently in use, there is no support for gesture recognition. In contrast, the embodiments described above use gesture recognition for security features, such as arm away, arm stay, panic, and duress.

Currently available security systems implement user actions (e.g., disarm, panic situations, etc.) through either manually activated pushbuttons or activation of a touch-screen. By using the above embodiments, it is also possible to accomplish these actions with the help of gesture recognition.

The above security system is low cost, easy to use, and requires very little additional power for gesture recognition. The PIR array operates to automatically identify the different gestures exhibited by the end user. The gestures are, thus, analyzed and interpreted to accomplish normal end user panel activities, such as arm away, arm stay, duress, medical panic invocation, and police panic invocation.

These same gesture recognition features may be extended to provide the end user with the ability to execute any sort of MACRO command programmed into the control panel. This ability provides a hygienic way of operating the security system where touch is not required either on the buttons or on the touch screen.

The PIR array can be located proximate the user interface near the keypad or touchscreen, can involve the use of a special device interface that allows the PIR array to be placed in any convenient position that is most comfortable for the end user, or may be wall mounted in some other convenient location.

Stated in another way, the PIR array can be located adjacent the keypad, among the buttons of the keypad, or installed as a stand-alone device. The PIR array can be a 4×4, 6×6, 12×12, or any other appropriately size array.

Different gesture actions (e.g., horizontal right, horizontal left, vertical, etc.) can be programmed into the control panel in order to invoke any of a number different security actions (e.g., arm away, arm stay, macros, etc.). Gestures that could be used may include one or more of: 1) horizontal right to execute an arm away instruction; 2) horizontal left to execute an arm stay instruction; 3) vertical upwards to execute a quick exit instruction; 4) vertical downwards to execute a duress alarm instruction; 5) primary diagonal upwards to execute a medical panic alarm instruction; 6) primary diagonal downwards to execute a police panic alarm instruction; 7) clockwise circular gesture to execute a fire panic instruction; 8) counterclockwise circular gesture to execute a chime mode instruction; 9) an inward movement to execute a first macro instruction; 10) an outward movement to execute a second macro instruction; 11) secondary diagonal upwards to execute a third macro instruction and 12) secondary diagonal downwards to execute a fourth macro instruction.

In general, the system may include a security system that protects a secured geographic area, a passive infrared (PIR) array associated with the security system, and a processor of the security system that detects one of a plurality of predetermined hand motions by an authorized user based upon a signal from the PIR array and causes the security system to execute a predetermined instruction associated with that one predetermined hand motion.

Alternatively, the system may include a security system that protects a secured geographic area, a user interface located within the secured area that controls the security system, a passive infrared (PIR) array associated with the user interface, and a processor of the security system that executes one of a plurality of predetermined instructions by detecting a corresponding hand motion made by an authorized user via the PIR array.

Alternatively, the system may include a security system that protects a secured geographic area, a user interface located within the secured area that controls the security system, a passive infrared (PIR) array that detects one of a plurality of predetermined hand motions made by an authorized user at the user interface, and a processor of the security system that executes one of a plurality of predetermined instructions based upon the detected hand motion made by the authorized user.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be add to or removed from the described embodiments.

The invention claimed is:

1. An apparatus comprising:
a security system that protects a secured geographic area;
a passive infrared array associated with the security system;
a processor of the security system that detects user hand motion based upon a signal from the passive infrared array, matches the user hand motion to a selected one of a plurality of reference hand motions saved in a memory, and causes the security system to execute a predetermined instruction associated with the selected one of the plurality of reference hand motions,
wherein a first one of the plurality of reference hand motions comprises a first gesture across the passive infrared array in a first direction,
wherein the predetermined instruction associated with the first one of the plurality of reference hand motions includes an arm away command,
wherein a second one of the plurality of reference hand motions comprises a second gesture across the passive infrared array in a second direction opposite the first direction, and
wherein the predetermined instruction associated with the second one of the plurality of reference hand motions includes an arm stay command.

2. The apparatus as in claim 1 wherein the passive infrared array is carried by a user interface of the security system.

3. The apparatus as in claim 2 wherein the passive infrared array is attached to a keypad of the user interface.

4. The apparatus as in claim 1 wherein the passive infrared array is carried by a wall proximate a user interface of the security system.

5. The apparatus as in claim 1 wherein the passive infrared array includes a 4 by 4 array of passive infrared devices.

6. The apparatus as in claim 1 wherein each of the plurality of reference hand motions saved in the memory include a respective sequence of predetermined hand positions across a field of view of the passive infrared array.

7. The apparatus as in claim 6 wherein the respective sequence of predetermined hand positions includes a respective predetermined time interval between each hand position of the respective sequence of predetermined hand positions.

8. The apparatus as in claim 1 wherein the first direction is rightward across the passive infrared array.

9. The apparatus as in claim 1 wherein the second direction is leftward across the passive infrared.

10. An apparatus comprising:
a security system that protects a secured area;
a user interface located within the secured area that controls the security system;
a passive infrared array associated with the user interface; and
a processor of the security system that executes a selected one of a plurality of predetermined instructions by matching user hand motion made with respect to the passive infrared array to a selected one of a plurality of reference hand motions saved in a memory that corresponds to the selected one of the plurality of predetermined instructions,
wherein a first one of the plurality of predetermined instructions includes an arm away command and corresponds with a first one of the plurality of reference hand motions that includes a first gesture across the passive infrared array in a first direction, and
wherein a second one of the plurality of predetermined instructions includes an arm stay command and corresponds with a second one of the plurality of reference hand motions that includes a second gesture across the passive infrared array in a second direction opposite the first direction.

11. The apparatus as in claim 10 wherein the passive infrared array is attached to a keypad of the user interface.

12. The apparatus as in claim 10 wherein the passive infrared array is carried by a wall proximate the user interface of the security system.

13. The apparatus as in claim 10 wherein the passive infrared array includes a 4 by 4 array of passive infrared devices.

14. The apparatus as in claim 10 wherein the plurality of predetermined instructions includes one or more of arm away, arm stay, quick exit, duress, medical panic, police panic, fire panic, and chime modes.

15. An apparatus comprising:
a security system that protects a secured area;
a user interface located within the secured area that controls the security system;
a passive infrared array that detects one of a plurality of predetermined hand motions made at the user interface; and
a processor of the security system that executes one of a plurality of predetermined instructions corresponding to the one of the plurality of predetermined hand motions,
wherein the one of the plurality of predetermined instructions includes at least one of an arm away command and an arm stay command, and
wherein the one of the plurality of predetermined hand motions includes at least one of a first gesture across the passive infrared array in a first direction and a second gesture across the passive infrared array in a second direction.

16. The apparatus as in claim 15 wherein the passive infrared array further comprises a 4×4 array.

* * * * *